United States Patent

Clark

[15] 3,684,300

[45] Aug. 15, 1972

[54] CARTRIDGE EJECT AND TAPE HEAD INDEXING ACTUATOR MECHANISM

[72] Inventor: Alfred J. Clark, Palatine, Ill.

[73] Assignee: Motorola, Inc., Franklin Park, Ill.

[22] Filed: Feb. 11, 1971

[21] Appl. No.: 114,441

[52] U.S. Cl. ....................274/4 A

[51] Int. Cl. ....................G11b 5/00

[58] Field of Search ...........274/4 A, 4 B, 11 A, 11 B; 179/100.2 CA, 100.2 Z

[56] References Cited

UNITED STATES PATENTS

| | | | |
|---|---|---|---|
| 3,445,116 | 5/1969 | Knox | 274/4 A |
| 3,485,500 | 12/1969 | Loeschner et al. | 274/11 B |
| 3,492,005 | 1/1970 | Veno et al. | 274/4 B |

*Primary Examiner*—Harry N. Haroian
*Attorney*—Vincent Rauner and R. J. LaPorte

[57] ABSTRACT

A magnetic tape head indexing and cartridge eject actuator mechanism for a tape player which uses exchangeable multi-track tape cartridges, includes a pair of pivotally mounted arms each spring biased to first positions and rotatable in opposite directions against corresponding biasing springs to second positions. A manually operated actuator rod connected to both arms is movable in a first direction to rotate the first arm to the second position, whereby the first arm engages and operates a cartridge eject mechanism and in a second direction to rotate the second arm to the second position, whereby the second arm actuates magnetic tape head indexing apparatus.

12 Claims, 7 Drawing Figures

INVENTOR
ALFRED J CLARK
BY
Ronald J. LaPorte
ATTORNEY

INVENTOR
ALFRED J CLARK
BY
Ronald J. LaPorte
ATTORNEY

CARTRIDGE EJECT AND TAPE HEAD INDEXING ACTUATOR MECHANISM

BACKGROUND OF THE INVENTION

This invention relates generally to a cartridge type tape player including a magnetic tape head adjustable to play the various tracks of a multi-track tape enclosed in a cartridge received therein, and more particularly to apparatus for actuating a magnetic tape head indexing mechanism and a cartridge eject mechanism in the player.

It is desirable during the playing of a multi-track tape cartridge to be able to change easily the position of the magnetic tape head with respect to the tape tracks for the purpose of selecting any one of the tracks at will. It is also desirable to be able to quickly eject a cartridge from the player at any time during the playing of the tape.

In many cartridge type tape players, the above-mentioned functions are performed by separate controls. In the case, however, where the cartridge player is mounted for use in an automobile, it is often difficult for a driver to find the separate controls to perform the functions while driving the automobile. Furthermore, such an attempt to find the controls could be hazardous.

SUMMARY OF THE INVENTION

Accordingly, it is a primary object of the present invention to provide in a cartridge type tape player, a new and improved actuator mechanism for changing both the position of the magnetic tape head with respect to the tape and for ejecting the cartridge from the player when desired.

It is another object of the invention to provide apparatus of the above-described type in a cartridge tape player for use in an automobile.

Briefly, a preferred embodiment of a manual magnetic tape head indexing and cartridge eject actuating mechanism according to the invention comprises first and second arms mounted for pivotal movement about the same pivot point. The first arm is rotatable from a first to a second position in one direction against a biasing spring resiliently holding the arm in the first position, and the second arm is rotatable from a first to a second position in the opposite direction against a biasing spring resiliently holding the arm in the first position. An actuator rod is connected to both arms and extends from the cartridge tape player in which the tape head indexing and cartridge eject actuating mechanism is included.

Movement of the actuator rod away from the tape player rotates the first arm into engagement with an arm of a cartridge locking and eject assembly thereby to cause the cartridge to be ejected from the player. Movement of the actuator rod toward the tape player rotates the second arm into engagement with a pair of normally "open" contacts to "make" the contacts. The operation thereof completes a circuit to tape head indexing apparatus in the player, operating the latter to change the position of the magnetic tape head with respect to the various tracks on the tape.

Figures 3, 3A, 4, 4A, 5:
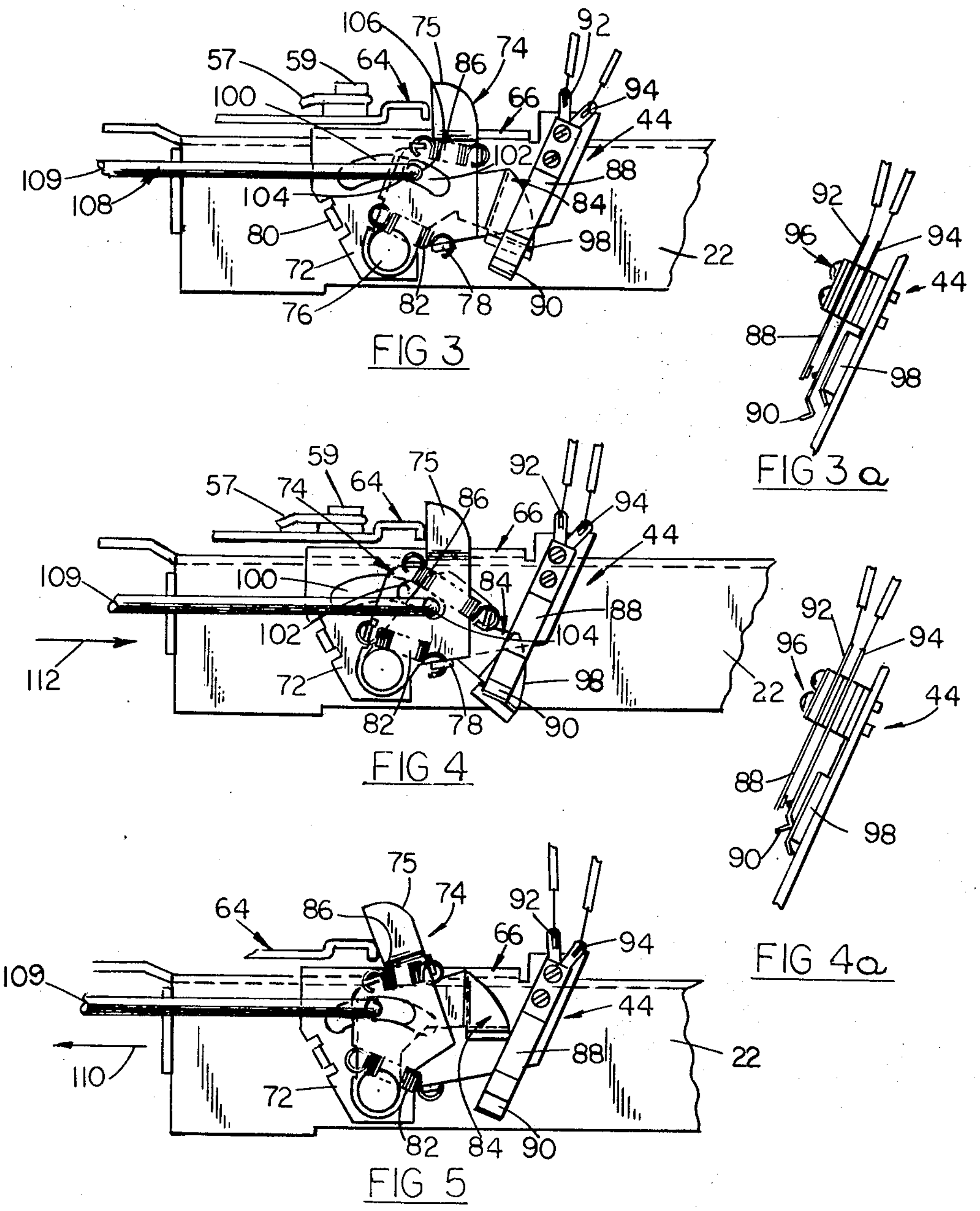
FIG. 3 is a side sectional view of the tape head indexing and cartridge eject actuator mechanism of the tape player of FIG. 2.

FIG. **3*a* is an end view of the switch contacts of the tape head indexing portion of the actuator mechanism of FIG. 3** shown in the unoperated condition;

FIG. 4 is a side sectional view of the tape head indexing and cartridge eject actuator mechanism of FIG. 3 as it appears when operating the tape head adjustment switch contacts thereof;

FIG. **4*a* is an end view of the switch contacts of the tape head indexing actuator mechanism of FIG. 4; and FIG. 5 is a side sectional view of the tape head indexing and cartridge eject actuator mechanism of FIG. 3** as it appears in the cartridge eject position.

DETAILED DESCRIPTION

Figure 1:
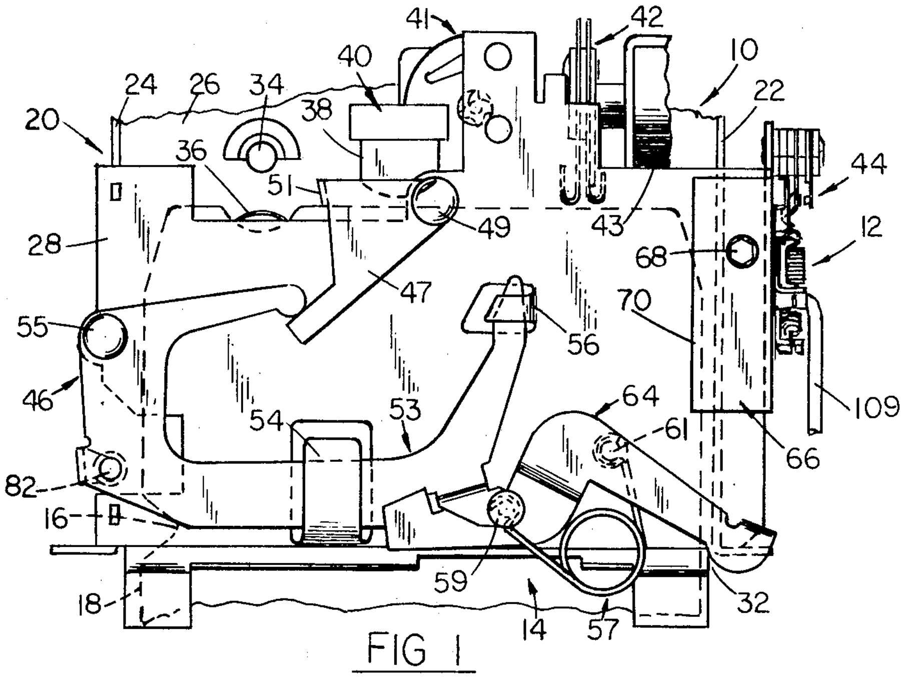
FIG. 1 is a top, sectional plan view of a cartridge type tape player including a tape head indexing and cartridge eject actuator mechanism according to the invention.
Figure 2:
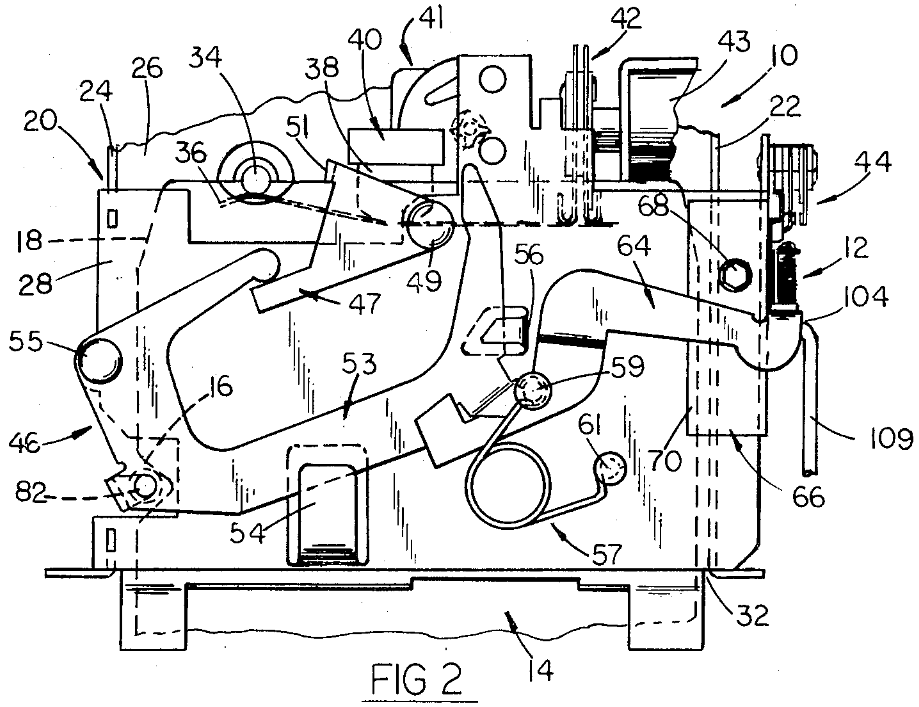
FIG. 2 is a top, sectional plan view of the cartridge tape player of FIG. 1, shown with a tape cartridge inserted fully thereinto.

Referring now to the drawings wherein like numerals have been employed to designate similar components throughout the various views, there is illustrated in FIGS. 1 and 2 a tape player, designated generally by the numeral 10, including a manually operated tape head indexing and cartridge eject actuator mechanism 12 according to the invention.

The tape player 10 is adapted to receive and play a tape cartridge 14 of the usual type having a recorded multi-track tape therein and a V-shaped groove or notch 16 formed along a side wall 18 thereof.

The tape player 10 includes a chassis 20 having a pair of side walls 22, 24, interconnected by bottom and top walls 26, 28, respectively, to form a cavity or tunnel 30 having a mouth or open end 32 through which the cartridge 14 is received.

Extending upwardly from bottom wall 26 in communication with tunnel 30, is a capstan shaft 34 against which a pressure roller 36 mounted in tape cartridge 14, and over which the magnetic tape passes, is pressed upon insertion of the cartridge fully into tunnel 30 (see FIG. 2).

The capstan shaft 34 is driven in a conventional manner by a motor and pulley arrangement (not shown) to move the tape in cartridge 14 therethrough and past a magnetic tape head 38 mounted on chassis 20 in communication with cartridge receiving tunnel 30.

The magnetic tape head 38 is mounted on a suitable bracket arrangement 40 designed for movement of the tape head in a plane adjacent the tape in cartridge 14 in a direction transverse the movement of the tape for the purpose of selectively playing certain ones of the various tracks on the tape. Electrically operated apparatus 41 including solenoid 43 is provided to automatically index the magnetic tape head 38 with respect to the various tracks on the tape in response to the completion of a circuit between a pair of contacts 42 mounted adjacent and in contacting relation with the tape in cartridge 14. A conductive strip (not shown) on the tape, completes the circuit between contacts 42, as it passes therebetween to electrically operate the above-described apparatus which in turn moves bracket arrangement 40 to position the tape head to one of a plurality of positions with respect to the tape in cartridge 14. An example of automatic electrically operated tape head indexing apparatus of the type described can be seen in co-pending U. S. patent application, Ser. No. 834,076, now U.S. Pat. No. 3,636,782, filed June 17, 1969, and assigned to the same assignee as the instant invention.

As will be explained in greater detail hereinafter, a contact pair 44 of the type shown in the drawings is incorporated in the manually operated actuator mechanism 12 for manually actuating the indexing apparatus 43 for the tape head, when desired.

The tape player 10 includes a mechanical cartridge locking and ejector assembly 46 similar to the type shown and described in U. S. Pat. No. 3,485,000, issued Dec. 23, 1969, and assigned to the same assignee as the instant invention. Briefly, the last-mentioned assembly 46 includes a linkage including a first arm or bell crank 47 pivotally mounted to top wall 28 of chassis 20 by rivet 49. A projection 51 extends from arm 47 into cartridge receiving tunnel 30 for engagement with a cartridge received therein. The linkage includes a second arm 53 which is pivotally mounted by rivet 55, to, and for movement along top wall 28 beneath guide tabs 54, 56. An overcenter or snap-over spring 57 has one end connected at spring post 59 to the arm 53. The other end is connected to a stationary spring post 61 extending from top wall 28.

Insertion of cartridge 14 into tunnel 30 in engagement with projection 51, rotates arm 47 which in turn causes arm 53 to rotate until the cartridge 14 is fully inserted into tunnel 30 (FIG. 2). Upon fully inserting the cartridge into tunnel 30, spring 57 snaps over from a first stable state, as shown in FIG. 1, to a second stable state, as shown in FIG. 2. Also, a roller 82, mounted on arm 53, is moved toward the side wall 18 of the cartridge 14 and into V-shaped groove or notch 16 to secure the cartridge in the "play" position in the player 10.

Removal of the tape cartridge may be accomplished by pulling the cartridge out of the tunnel 30 to cause overcenter spring 57 to snap-over from the second to the first stable state. The "snapping-over" of the spring provides the force necessary at projection 51 engaging the cartridge to eject the latter from the player.

As shown in FIGS. 1 and 2, a third arm 64 attached to arm 53 extends outwardly therefrom toward side wall 22 of the player for engagement with the cartridge eject arm of the cartridge eject and tape head indexing actuator mechanism 12 according to the invention. If desired, arm 64 may be integrally formed with arm 53. The latter configuration would, it is suggested, facilitate fabrication of the linkage arm members.

The manually operated magnetic tape head indexing and cartridge eject actuator mechanism 12 is mounted on an L-shaped bracket 66 attached by a suitable fastener 68 at leg 70 thereof to the top wall 28 of chassis 20. The other leg 72 (see FIGS. 3–5) extends downwardly, parallel to side wall 22 on the side thereof opposite tunnel 30.

A cartridge eject arm 74 mentioned heretofore, is pivotally mounted to leg 72 by rivet 76. The arm 74 is movable between first and second positions at stops 78, 80, respectively, extending from leg 72 of the bracket. Arm 74 is biased toward the first position, against stop 78, by spring 82 attached to the last-mentioned stop and to arm 74. A free end 75 of arm 74 is positioned for engagement with arm 64 of the locking mechanism 46.

A second arm 84 is likewise mounted for pivotal movement on leg 72 of the bracket by rivet 76. Arm 84 is sandwiched between arm 74 and leg 72, but both arms, 74, 84, are freely and independently pivotal about rivet 76. The arm 84 is connected via spring 86 to arm 74. Leaf spring contacts 88, 90 of contact pair 44, mentioned heretofore, are connected electrically at ends 92, 94, respectively, to the solenoid 43 of indexing mechanism 41 of tape player 10. The leaf springs are mounted by insulating separator and fastener assembly 96 to bracket leg 72.

The free end 98 of arm 84 is positioned for engagement with leaf spring contact 90, to close contacts 88, 90, thus completing an electrical connection to the tape head indexing mechanism 43 for actuating the latter, and thus changing the position of the tape head with respect to the tape in cartridge 14. The arm 84, however, is maintained normally in a position out of engagement with the end 98 of arm 84 by spring 86.

An arcuate slot 100 is formed in leg 72 of bracket 66. A shorter slot 102 aligned with slot 100 is formed in arm 74 and an aperture 104 aligned with the aforementioned slots is formed in arm 84. The end 106 of an actuator rod 108 is inserted through the aperture 104 and slots 100, 102. The free end 109 of rod 108 extends outwardly toward the open end of tunnel 30 of the tape player, for manual operation thereof.

Operation of the magnetic tape head indexing and cartridge eject actuator mechanism 12 of the invention can be explained in greater detail by referring to FIGS. 3, 3*a*, 4, 4*a* and 5 of the drawings. After a cartridge 14 is received in tunnel 30 of tape player 10 to move the cartridge locking mechanism 46 to its "locked" position as shown in FIG. 2 of the drawings, the cartridge may be manually ejected from player 10 at any time by moving rod 108 from the neutral position (FIG. 3) in the direction of arrow 110 (FIG. 5). Movement of rod 108 as described pivots arm 74 in a counterclockwise direction as seen in the drawings, against the force of biasing spring 82, so that end 75 of arm 74 engages arm 64, moving the latter and arm 53 about rivet 55 (FIGS. 1 and 2) against the force of overcenter spring 57. The last-mentioned spring 57 is moved thereby from its second stable state (FIG. 2) toward a first stable state (FIG. 1). The latter movement in turn rotates arm 47 to engage projection 51 with cartridge 14, ejecting the cartridge from the player by the force provided by the overcenter spring 57. It should be noted that arm 84 is rotated along with arm 74 in a counterclockwise direction (FIG. 5) because the arms are interconnected by spring 86. The movement of arm 84 during the ejecting process performs no function however.

To change the position of tape head 38 with respect to the tracks on the multi-track tape in cartridge 14 when desired, rod 108 is moved toward the player (in the direction of arrow 112, FIG. 4) opposite from the direction of movement of rod 108 during the cartridge eject function. Movement of rod 108 in the direction of arrow 112, rotates arm 84 in a clockwise direction as viewed in the drawings, against the force of spring 86, (FIG. 4), so that end 98 of arm 84 slidably engages leaf spring contact 90 (FIG. 4a). Engagement of leaf spring 90 "makes" contacts 88, 90, thereby to actuate the tape head indexing apparatus 43 of the tape player 10. During the indexing movement of rod 108, end 104 thereof moves through slot 102 in arm 74 thereby preventing engagement with arm 74 which is at rest against stop 78, while moving arm 64 as described.

Thus, the manual cartridge eject and tape head indexing mechanism permits one to eject a cartridge from the player or to change the tape head position with respect to the tracks on the multi-track tape being played, at will. Furthermore, both functions can be performed with a single control, thereby, in the case of a tape player used in an automobile, avoiding the need to search for a plurality of controls to perform the functions.

The manual cartridge eject and tape head indexing mechanism according to the invention, which comprises a minimum of components, is efficient in operation, simple in construction and relatively inexpensive to produce.

While a particular embodiment of the invention has been shown and described, it should be understood that the invention is not limited thereto since many modifications may be made. It should be noted that contacts 88, 90 could be used for operating other electrically controlled instrumentalities in the tape player as well as for operating the tape head indexing assembly. The closing of contacts 88, 90, could for example, be used to increase and decrease the volume of the tape player if desired.

It is therefore contemplated to cover by the present application any and all such modifications as fall within the true spirit and scope of the appended claims.

I claim:

1. In a cartridge type tape player using an exchangeable, multi-track tape cartridge and including a magnetic tape head for movement adjacent the tape to position the tape head with respect to the various tracks thereon, means for moving the tape head, and means actuable for ejecting the cartridge from the player, respectively, a magnetic tape head adjustment and cartridge eject actuator mechanism, comprising: first means movable between first and second positions, means resiliently biasing said first means to said first position, said first means actuating said cartridge eject means upon being moved to said second position, for ejecting said cartridge from said player, second means movable between first and second positions, means resiliently biasing said second means to said first position, said second means actuating said tape head moving means upon being moved to said second position, and control means movable from a neutral position in first and second directions, to move said first means to the cartridge eject actuating position and the second means to the tape head actuating position, respectively.

2. A magnetic tape head adjustment and cartridge eject actuator mechanism as claimed in claim 1 wherein said first means include an arm member mounted for pivotal movement and being spring biased toward said first position, said arm member engaging said cartridge eject means upon being moved from said first to said second position, wherein said second means include a second arm member mounted for pivotal movement about a pivot point common with that of said first mentioned arm member, and being spring biased toward said first position, and wherein said mechanism further includes contact means connected electrically to said tape head moving means said second arm member being engageable with said contact means in the second position to actuate said contact means for changing the position of the tape head with respect to said tape.

3. A magnetic tape head adjustment and cartridge eject actuator mechanism as claimed in claim 2 wherein the arm member of said first means is movable in a first direction and the arm member of said second means is movable in the opposite direction, and wherein said control means includes an elongated actuator member coupled to said arm members and movable in said first and second directions to move said arm members, respectively, as desired.

4. In a cartridge type tape player using an exchangeable, multi-track tape cartridge and including a magnetic tape head mounted for movement along a path adjacent the tape to index the tape head with respect to the various tracks thereon, means for moving said tape head along said path, a cartridge locking and ejector assembly including means engageable with a cartridge received in said player and movable from a first to a second position upon receipt of a cartridge into said player and from said second to said first position in accordance with the removal of said cartridge from said player and bistable force transmitting means connected to said means and operable to first and second stable states for maintaining the cartridge in the player when the cartridge is inserted thereinto and for ejecting the cartridge from the player, respectively, a magnetic tape head indexing and cartridge eject actuator assembly comprising: first and second arms each mounted for pivotal movement about a common pivot point, said first arm being spring biased to a first position and rotatable against said spring bias to a second position for engagement with said cartridge engaging means to actuate said bistable force transmitting means for ejecting said cartridge from said player, said second arm being spring biased to a first position and rotatable against said spring bias to a second position for operating said tape head moving means thereby to change the position of said tape head with respect to said tape, and a manually operable actuator member connected to said first and second arms and movable from a neutral position in one direction to a first position for moving said first arm from said first to said second position, and movable in the opposite direction to move said second arm from said first to said second position.

5. A magnetic tape head indexing and cartridge eject actuator assembly as claimed in claim 4 further including a pair of electrical contacts mounted for engagement by said second arm upon movement thereof from said first to said second position, wherein said tape head moving means is operated electrically and wherein said contacts are connected electrically to said tape head moving means, whereby operation of the contacts by said second arm actuates said tape head moving means to index said tape head with respect to said tape.

6. A cartridge type tape player using an exchangeable multi-track tape cartridge comprising, in combination; a magnetic tape head mounted for movement along a path adjacent the tape to position the tape head with respect to the various tracks on said tape; a tape head moving assembly for moving said tape head along said path; an electrically operated solenoid coupled to said tape head moving assembly for operation thereof; a cartridge locking and ejector assembly including linkage means, bistable force transmitting means coupled to said linkage means for biasing the latter to first and second stable positions and means coupled to said linkage means including a projection engageable with a cartridge inserted into said player and being responsive thereto to move said linkage means from said first stable position to actuate said bistable force transmitting means to bias said linkage means to said second stable position, said bistable force transmitting means being actuable to bias said linkage means from said second to said first stable state for ejecting said cartridge from said player; and cartridge eject and tape head indexing actuating means comprising; contact means electrically coupled to said solenoid, first and second arms mounted for pivotal movement about a common pivot point, each said arm being pivotal between first and second respective positions and each being resiliently biased to said first position, said first arm movable from said first to said second position for engagement with said linkage means for actuation of said bistable force transmitting means, thereby to move said linkage means from said second to said first stable position, whereby said cartridge is ejected from said player, and said second arm being movable from said first to said second position for actuation of said contact means to in turn operate said solenoid and tape head indexing assembly, and control means coupled to said first and second arms and movable from a neutral position to first and second positions for pivoting said first and second arms from said first to said second positions, respectively.

7. A cartridge type tape player as claimed in claim 6 wherein said control means includes a manually operated actuator rod movable in a first direction from the neutral to said first position and in the opposite direction from the neutral to said second position.

8. In an apparatus using an exchangeable, multi-track tape cartridge, including linkage means, overcenter spring means coupled to said linkage means for biasing the same to first and second stable positions and means coupled to said linkage means and being responsive to a cartridge inserted into the apparatus to move said linkage means from said first stable position to actuate said overcenter spring to bias said linkage means to said second stable position, cartridge eject actuating means for actuating said overcenter spring means to move said linkage means from said second to said first stable position, whereby said cartridge is ejected from said apparatus, said cartridge eject actuating means comprising an arm member mounted for movement between a first and second position, said arm member engaging said linkage means upon being moved from said first to said second position for actuating said overcenter spring means, thereby to eject said cartridge from said apparatus, means resiliently biasing said arm member to said first position, and control means coupled to said arm member for moving said arm member from said first to said second position against said biasing means.

9. Apparatus as claimed in claim 8 further including a magnetic tape head mounted for movement along a path adjacent said tape cartridge to index the tape head with respect to the various tracks on the tape therein, electrically operated means for moving said magnetic tape head along said path, and magnetic tape head indexing actuator means for operating said electrically operated moving means, comprising an arm member mounted for movement adjacent said cartridge eject actuating arm member and being movable between first and second positions, contact means operable in response to the movement of said magnetic tape head indexing actuator arm member to said second position, and resilient biasing means biasing said last mentioned arm member to said first position, and wherein said control means is coupled to said magnetic tape head indexing actuator arm for movement thereof from said first to said second position.

10. Apparatus as claimed in claim 9 wherein said arm members are mounted for pivotal movement about a common pivot point and wherein said control means includes an actuator rod movable from a neutral to a first position in a first direction to operate said cartridge ejector actuating arm member and from said neutral to a second position in a second, opposite direction to actuate said magnetic tape head indexing actuator arm member.

11. A cartridge type tape player using an exchangeable, multi-track tape cartridge, comprising: means engageable with said cartridge upon insertion thereof into said player, said cartridge engaging means being movable from a first to a second position in response thereto, force transmitting means coupled to said cartridge engaging means and actuable to apply a force thereto to move said cartridge engaging means from said second to said first position for ejecting said cartridge from said player, and means for actuating said force transmitting means including an arm mounted for movement between first and second positions and resiliently biased toward said first position, said arm engaging said cartridge engaging means for actuation of said force transmitting means upon being moved from said first to said second position, and control means coupled to said arm for moving the latter from said first to said second position.

12. A cartridge type tape player as claimed in claim 11 further including electrically operated tape playing instrumentalities and wherein said actuator means includes a second arm, said second arm and said first mentioned arm being mounted for pivotal movement about a common pivot point, said second arm being movable from a first to a second position and being resiliently biased toward said first position, and resilient contact means mounted for engagement by said second arm for actuation thereby upon moving said second arm from said first to said second position, said contact means being connected electrically to said tape playing instrumentalities for operation thereof, and wherein said control means comprises a member coupled to both said arms and movable from a neutral to a first position in one direction to move said first arm from said first to said second position and from said neutral to a second position in the opposite direction to move said second arm from said first to said second position.

* * * * *